No. 635,774. Patented Oct. 31, 1899.
A. HEINEMANN & W. SCHÄFER.
STORAGE BATTERY.
(Application filed Sept. 4, 1897.)
(No Model.) 2 Sheets—Sheet 1.
Fig. 1.
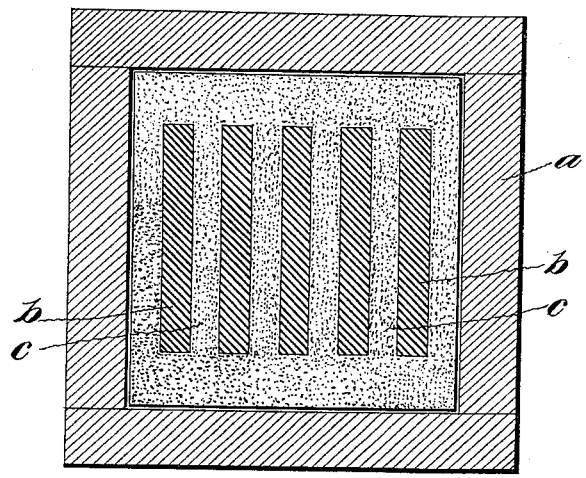
Fig. 2.
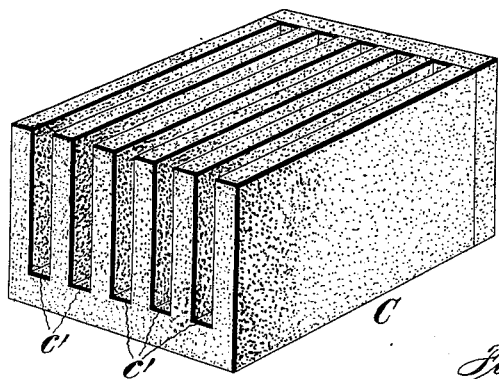
Fig. 3.
Fig. 4.
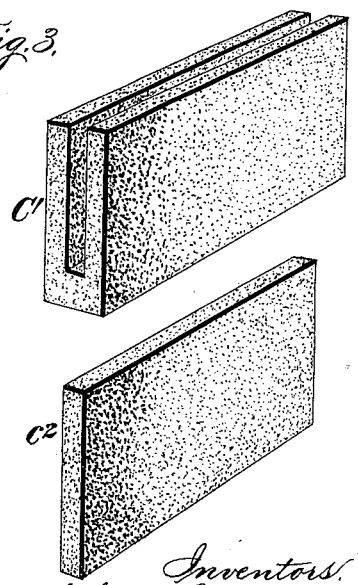
Witnesses:
B. T. Ober
B. T. Sommers
Inventors:
Arthur Heinemann
Wilhelm Schäfer
by
Atty.

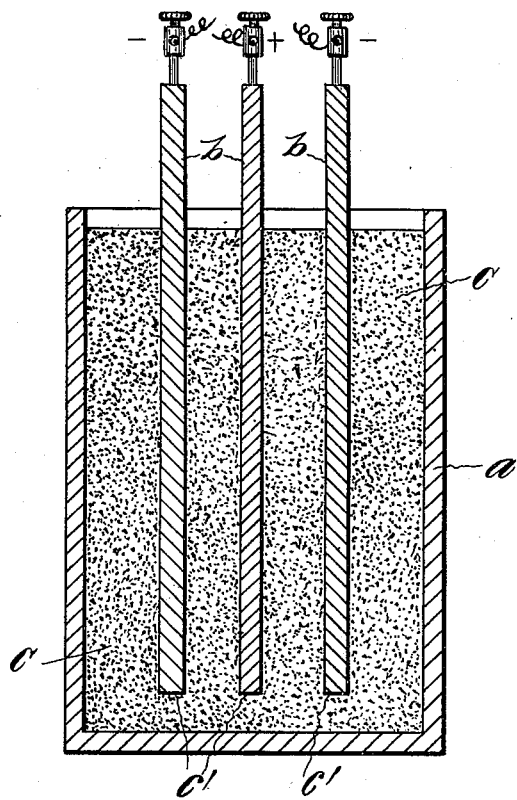

UNITED STATES PATENT OFFICE.

ARTHUR HEINEMANN AND WILHELM SCHÄFER, OF BERLIN, GERMANY.

STORAGE BATTERY.

SPECIFICATION forming part of Letters Patent No. 635,774, dated October 31, 1899.

Application filed September 4, 1897. Serial No. 650,684. (No model.)

*To all whom it may concern:*

Be it known that we, ARTHUR HEINEMANN and WILHELM SCHÄFER, of Berlin, Germany, have invented certain new and useful Improvements in and Relating to Electric Accumulators or Storage Batteries, (for which Letters Patent have been obtained in Luxemburg, sub No. 2,877, dated June 24, 1897;) and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to electric accumulators or storage batteries, and more particularly to the so-called "dry" storage batteries—that is to say, to that type of battery in which an absorbent material for the electrolyte is used, so that there will not be present any liquid liable to be spilled from any cause.

Various absorbents have before our invention been used in the type of storage battery referred to, such as gypsum, silicic acid, gelatin, and the like, and, as is well known, all of these substances are subject to chemical as well as electrochemical transformation or decomposition, which tends, according to the substance used, to the more or less rapid destruction of the electrodes and of the absorbent itself, while at the same time a variable, but still a considerable, portion of the electric energy is used up in this transformation or decomposition and the capacity of the battery correspondingly lowered. On the other hand, when the absorbent is moved out of contact with or separated from the electrodes under the influence of the gas evolved in charging the battery such contact, owing to the nature of the absorbent, is or cannot afterward be reëstablished, so that it is nearly always necessary to pour a liquid electrolyte upon the set or solidified absorbent in order to establish the required intimate contact between such absorbent and the electrodes, so that the object aimed at—namely, a dry battery—is practically nullified in that the liquid electrolyte added is liable to be spilled under such conditions of use as render a dry battery either desirable or necessary. An absorbent for the purposes referred to should therefore possess in addition to its absorbent qualities the following properties in order that the disadvantages referred to may be obviated: It should be a non-conductor of electricity absolutely indifferent to the action of the electrolyte, as well as to the action of the electric current, and should at all times and under any circumstances remain in intimate contact with the electrodes, so that a supernatant or covering liquid electrolyte may not become necessary.

We have discovered that chemically-pure charcoal possesses all of the properties referred to. It is, like a diamond, a non-conductor of electricity, while other carbons, as graphite, various animal carbons, and all other carbons exposed to a high temperature to render the same more or less graphitic, as coke, carbon for arc and incandescent lamps, and the like, are more or less good conductors of electricity.

If ordinary wood-charcoal is freed from its organic and inorganic impurities, it becomes a non-conductor of electricity, absolutely indifferent to electric action, as well as to the action of the attenuated solutions of sulfuric acid usually employed in storage batteries. It does not enter into chemical combinations or reactions, either with the lead or its oxids, nor can it be decomposed or destroyed by the chemical or electrochemical reactions which take place in accumulators or by the direct action of the current.

Charcoal freed from its organic and inorganic impurities, as described, also possesses, in view of its porosity, due to its cellular structure, an extraordinary power of absorption for liquids and affords free passage therethrough to gases. Thus, for instance, three hundred and ninety-two cubic centimeters of charcoal freed from all conductive impurities will absorb two hundred and ninety-five cubic centimeters of sulfuric acid, the volume of the two being only four hundred cubic centimeters, so that the increase in volume by the absorption of nearly three hundred cubic centimeters of sulfuric acid by three hundred and ninety-two cubic centimeters of such charcoal is only eight cubic centimeters.

The charcoal obtained either by the dry process (dry distillation) or preferably by the wet process (the action of acids) is freed from its organic and inorganic constituents in any suitable manner—as, for instance, by pulverizing the charcoal and treating it in the presence of heat with a mineral acid, whereby the constituents in the form of ash-salts are dissolved out and removed by washing with water. Besides these inorganic impurities the charcoal contains, as a rule, organic impurities which are eliminated by heat and washing, and these operations may be repeated as often as found necessary or until all of the organic and inorganic impurities have been eliminated from the charcoal, which is then again pulverized and is ready for use as an absorbent for storage batteries. To this end the electrodes are secured in position in the battery vessel or tank, the vacant spaces being then filled with the charcoal, which is preferably firmly tamped or rammed, after which it is saturated with the solution of sulfuric acid usually employed, so that on tipping the vessel over none of the solution will flow off. It has been shown that although the whole of the space not occupied by the electrodes is filled with the charcoal, yet the quantity of solution absorbed thereby is nearly equal to the quantity which would be required to fill the empty spaces, and this is due to the extraordinary porosity of the absorbent.

In the accompanying drawings, Figure 1 is a horizontal section of a storage battery embodying our invention. Fig. 1ª is a vertical section of a three-plate battery, showing the terminal connections. Fig. 2 is a perspective view of a cell molded of non-conductive charcoal for the reception of five electrodes and adapted to be placed in a suitable battery vessel. Fig. 3 is a fragmentary perspective view of a cell for a single electrode also molded of non-conductive charcoal, and Fig. 4 is a like view of one of the end plates of the cell shown in Fig. 2.

Referring to Fig. 1, $a$ indicates the battery vessel, which may be constructed of any suitable material. $b$ are the electrodes, and $c$ the filler of non-conducting charcoal tamped more or less firmly into the spaces between the electrodes $b$ and into the spaces between said electrodes and the battery vessel, so that the electrodes are completely embedded in the non-conductive carbon.

In Fig. 2 we have shown a cell C made of non-conductive charcoal by molding, the top and one of the end plates being removed, said cell designed to fit snugly into an outer or battery vessel and having recesses or pockets $c'$ for the reception of five electrodes, which latter are tightly fitted into said spaces, and $c^2$ indicates one of the end plates of the cell, the other being shown in Fig. 4.

Instead of molding a cell capable of holding all of the electrodes of a battery or a number of electrodes a separate cell $C'$ for each electrode may be molded, as shown in Fig. 3.

In the conversion of a wet into a dry battery by the means described the volume of the electrolyte is therefore but slightly reduced, while the object in view—namely, to prevent the flow of the electrolyte by binding the same mechanically—is more effectually attained than is the case in dry batteries as heretofore organized. The dry or charcoal-filled storage battery has, however, other advantages over the ordinary wet storage batteries. The charcoal prevents the formation of crystalline lead sulfate, which is usually formed in wet as well as in dry storage batteries and from which the destruction of the electrodes inevitably follows, a fact which can readily be demonstrated by short-circuiting the storage battery for some time, when an ordinary wet storage battery will be found to be completely destroyed by the formation of crystalline sulfates. Such a formation is not observable in our improved storage battery even after being short-circuited for months. This valuable property may, perhaps, be accounted for by the high absorbing power of the non-conductive charcoal, whereby the sulfuric acid radical ($SO_3$) is mechanically and so firmly bound that the electrolytic decomposition necessary to the combination of the oxygen and hydrogen ions alone can take place and the secondary formation of crystalline lead sulfates is prevented, and to this may, perhaps, also be attributed the greater volt efficiency of our battery, as we have found that the average density or tension of a charcoal-filled battery is from 0.1 to 0.3 volts greater than that of the most efficient storage batteries of equal capacity hitherto used. Furthermore, the charcoal acts as an excellent protective agent for the electrodes of the secondary elements in that it prevents the active material from dropping off. This is due to the fact that the electrodes are firmly embedded in the mass of charcoal, the bulk of which is not reduced by the action of the acid, as would be the case were a carbon that is a conductor of electricity used—that is to say, a graphitic carbon or so-called "hard-burned" carbon. The action of the acid on a conductive carbon would be such as to produce a shrinkage of the filling away from the electrodes and would not then act as a support for the active material and prevent its dropping off.

For the purpose last referred to various means have been proposed—such as protectors of felt, perforated celluloid, hard rubber, parchment-paper, asbestos, and many other substances—all of which, however, are affected by the chemical reactions in the active material, and, with the exception of hard rubber, by their liability to decomposition either under the direct action of the electric current or that of the sulfuric acid, while the products of these decompositions are injurious to the battery, reduce its capacity, and hasten its destruction, all of which is avoided by the use of the chemically-pure charcoal absorbent, which, as stated, is also a non-conductor of electricity.

The elimination of the organic and inorganic impurities may be greatly facilitated by the use of sawdust as a primary material, which is carbonized by treatment with concentrated sulfuric acid, whereby an extremely-fine and highly-porous carbon powder is obtained. Naturally-carbonized or more or less carbonized organic substances are also available for our uses—as, for instance, peat and other carbonized organic bodies, which of course have to be freed from their organic and inorganic impurities before use.

The chemically-pure charcoal can, as before stated, be used in a pulverulent form not only as an absorbent, but as a protective agent for the electrodes, or the pulverized charcoal can be molded by pressure in the form of a casing, so that the electrodes will fit snugly into suitable spaces therein and so that the carbon-casing itself will fit snugly into the battery vessel. This may also be attained by charring plates of wood, and after purifying the same, as described, fitting them into the battery-spaces not occupied by the electrodes.

Of course the gist of the invention will not be altered by the addition to the electrolyte of salts for increasing its conductivity or for other purposes or by the use of another electrolyte than a solution of sulfuric acid.

Having thus described our invention, what we claim as new therein, and desire to secure by Letters Patent, is—

A storage battery comprising a vessel, electrodes coated with an active material, and molded partitions made of pulverized non-conductive vegetable charcoal completely filling the spaces between said electrodes and the spaces between the latter and the battery vessel, said partitions saturated with the electrolyte, whereby a dry battery and a support for the active material on the electrodes are obtained, substantially as set forth.

In testimony that we claim the foregoing as our invention we have signed our names in presence of two subscribing witnesses.

ARTHUR HEINEMANN.
WILHELM SCHÄFER.

Witnesses:
HENRY HASPER,
WALDEMAR HAUPT.